(12) United States Patent
Fan

(10) Patent No.: US 11,892,027 B1
(45) Date of Patent: Feb. 6, 2024

(54) SUCTION CUP TYPE HOOK

(71) Applicant: Ruochen Fan, Ningbo (CN)

(72) Inventor: Ruochen Fan, Ningbo (CN)

( * ) Notice: Subject to any disclaimer, the term of this patent is extended or adjusted under 35 U.S.C. 154(b) by 0 days.

(21) Appl. No.: 18/331,725

(22) Filed: Jun. 8, 2023

(30) Foreign Application Priority Data

Sep. 30, 2022 (CN) .......................... 202222653365.7
Oct. 24, 2022 (CN) .......................... 202222807122.4

(51) Int. Cl.
    *F16B 47/00*     (2006.01)
    *F16M 13/02*     (2006.01)

(52) U.S. Cl.
    CPC ........... *F16B 47/00* (2013.01); *F16M 13/022* (2013.01)

(58) Field of Classification Search
    CPC .............................. F16M 13/022; F16B 47/00
    See application file for complete search history.

(56) References Cited

U.S. PATENT DOCUMENTS

| | | | | |
|---|---|---|---|---|
| 7,066,434 B2* | 6/2006 | Kwok | ................... | F16B 47/006 248/205.8 |
| 7,658,354 B2* | 2/2010 | Wang | ...................... | F16B 47/00 248/205.5 |
| 8,128,042 B1* | 3/2012 | Chen | ...................... | F16B 47/006 248/205.5 |
| 8,876,072 B2* | 11/2014 | Hsu | ...................... | F16M 13/022 248/205.5 |
| 8,894,030 B2* | 11/2014 | Nixon | ...................... | B62J 11/04 248/220.21 |
| 8,919,712 B2* | 12/2014 | Chen | ...................... | F16B 47/006 248/205.8 |
| 9,200,667 B1* | 12/2015 | Hsu | ........................ | F16M 13/02 |
| 9,732,785 B2* | 8/2017 | Kobayashi | .............. | F16B 47/00 |
| 11,160,355 B2* | 11/2021 | Martinez | ................ | B60N 3/101 |
| 2005/0236538 A1* | 10/2005 | Schmidt | ................... | A47K 1/09 248/205.5 |
| 2008/0023602 A1* | 1/2008 | Bury | ...................... | F16B 47/00 248/205.8 |
| 2018/0274722 A1* | 9/2018 | Worden, IV | .......... | F16B 47/003 |
| 2018/0363845 A1* | 12/2018 | Alifeld | ................... | A47K 5/122 |

* cited by examiner

*Primary Examiner* — Monica E Millner

(57) ABSTRACT

The present disclosure provides a suction cup type hook, including: a hook body, a suction cup, a spring, and a rotatable button. The hook body defines a mounting cavity opened toward a rear side and defines a connecting hole arranged on a front side; the suction cup includes a flexible deformation portion and a connecting rod; the rotatable button is disposed on the front side of the hook body, and the rotatable button is rotatably connected to the connecting rod and has a lifted state and a snapped state y; when the rotatable button is in the snapped state: the rotatable button pulls the middle of the flexible deformation portion forward, an edge of the flexible deformation portion abuts against the edge of the mounting cavity, and a rear side of the flexible deformation portion forms a concave arc.

12 Claims, 15 Drawing Sheets

SUCTION CUP TYPE HOOK

CROSS REFERENCE

The present disclosure claims priority of Chinese Patent Application No. 202222807122.4, filed on Oct. 24, 2022, and Chinese Patent Application No. 202222653365.7, filed on Sep. 30, 2022 the entire contents of which are hereby incorporated by reference in their entirety.

TECHNICAL FIELD

The present disclosure relates to household fixing apparatus, especially relates to a suction cup type hook.

BACKGROUND

For an existing suction cup type hook, the hook and the suction cup are in an integrated structure, with the hook being directly connected to the suction cup and the suction cup being prefabricated into a concave cover. That is, in a natural relaxed state, a side of the suction cup opposite to an adsorption support surface is a concave arc surface. When the suction cup type hook is used, the suction cup is squeezed from the outside in a direction toward the adsorption support surface, such that the suction cup deforms and is unfolded. After the release of external force, the suction cup is deformed under the action of its own elasticity toward the tendency of restoring the original state, and the volume between the suction cup and adsorption support surface is expanded, thereby forming a negative pressure space; in turn, under the conditions of atmospheric pressure difference, the suction cup is firmly adsorbed on the adsorption support surface. However, with the use of the suction cup, deformation and aging will occur, and amount of deformation of edges of the suction cup appears uneven changes, such that the negative pressure space is difficult to maintain sealed, and the suction cup type hook is easy to fall off.

SUMMARY OF THE DISCLOSURE

The main purpose of the present disclosure is to propose a suction cup type hook, aiming to solve the existing technical problems of low reliability of suction cup type hooks, which are prone to fall off after the aging of suction cup parts.

To solve the above technical problem, the present disclosure provides a suction cup type hook, including: a hook body, a suction cup, a spring, and a rotatable button; wherein the hook body defines a mounting cavity opened toward a rear side and defines a connecting hole connected to the mounting cavity and arranged on a front side; the suction cup includes a flexible deformation portion and a connecting rod extending forward from a middle of the flexible deformation portion, the flexible deformation portion being disposed on the rear side of the hook body; the connecting rod extends out of the mounting cavity through the connecting hole; the spring is sleeved on the connecting rod; an end of the spring is connected to an inner wall surface of the mounting cavity, and the other end of the spring is connected to a front side of the flexible deformation portion; the rotatable button is disposed on the front side of the hook body, and the rotatable button is rotatably connected to a front end of the connecting rod and has a lifted state and a snapped state relative to the hook body; in the lifted state, the flexible deformation portion is in a relaxed state and is separably arranged with an edge of the mounting cavity; when the rotatable button is pressed to switch to the snapped state: the rotatable button pulls the middle of the flexible deformation portion to protrude forward by the connecting rod, an edge of the flexible deformation portion abuts against the edge of the mounting cavity, and a rear side of the flexible deformation portion forms a concave arc.

In some embodiments, the hook body includes a mounting base, a connecting frame, and a hook member; the mounting cavity is defined in the mounting base, the connecting frame is fixedly connected to a bottom of the mounting base and extends downward, and the hook member is bent forward from the connecting frame.

In some embodiments, the mounting base includes a panel and an annular wall arranged on a rear side of the panel, and the panel and the annular wall enclose the mounting cavity; the panel defines the connecting hole connected to the mounting cavity; the spring is connected to the rear side of the panel; the rotatable button includes a snapping surface and a transition surface inclined to the snapping surface, the rotatable button is rotatably connected to the connecting rod around a transverse pivot line, and both the snapping surface and the transition surface are disposed at a periphery of the pivot line; a vertical distance from the snapping surface to the pivot line is greater than a vertical distance from the transition surface to the pivot line; the transition surface is adjacent to a front side of the panel in response to the rotatable button being in the lifted state; the snapping surface abuts against the front side of the panel in response to the rotatable button being in the snapped state.

In some embodiments, the annular wall includes a first compression ring and a second compression ring that are arranged concentrically from inside to outside; in the snapped state, the first compression ring and the second compression ring respectively abut against the edge of the flexible deformation portion.

In some embodiments, the panel is bent in a step shape to form a rotation limit table disposed in a lower part and a rotation limit cavity disposed in an upper part; the connecting hole is opened on a front side of the rotation limit cavity; in the snapped state, the rotatable button is disposed in the rotation limit cavity; an outer edge of the panel is rounded, an upper side of the rotation limit cavity is set horizontally, and a shape of the rotatable button is adapted to the rotation limit cavity in a fan-shaped structure; a chamfer is formed between an upper part of an outer periphery of the rotatable button and a rear side of the rotatable button, and the chamfer is enclosed with the front side of the rotation limit cavity to define an operating slot.

In some embodiments, the rear side of the rotatable button is recessed and defines a rotation connecting cavity, and two rotating connection plates are fixed in the rotation connecting cavity; the two rotating connection plates are parallel to each other and opposite in a left-right direction; each rotating connection plate defines a rotation hole, and the snapping surface and the transition surface are formed on the two rotating connection plates; the connecting rod defines transversely a shaft hole; the rotatable button is rotatably connected to the connecting rod by a shaft passing through the shaft hole and the two rotation holes; two limit strips are arranged and protrude from the front side of the rotation limit cavity, which are parallel to each other and opposite in the left-right direction, and the two rotating connection plates are restrictively arranged between the two limit strips.

In some embodiments, a rear end of the hook member is removably plugged into the connecting frame.

In some embodiments, the connecting frame defines a limit slot opened towards a front side, and a sliding guide is arranged on and protrudes from an inner side of a lower part of the limit slot; a width of the rear end of the hook member is adapted to a width of an upper part of the limit slot, and the rear end of the hook member defines a sliding slot adapted to the sliding guide for sliding up and down.

In some embodiments, the hook member includes a mounting plate, a load-bearing portion, and a suspension baffle; the mounting plate is arranged forward, the load-bearing portion is fixedly connected to the mounting plate and bent forward relative to the mounting plate, and the suspension baffle is fixedly connected to a front end of the load-bearing portion and bent upward; the lower part of the limit slot is through in a front-rear direction, the sliding guide is U-shaped; a width of a lower part of the mounting plate is tapering from top to bottom in an up-down direction, and the sliding slot is defined on an outer periphery of the lower part of the mounting plate and is U-shaped.

In some embodiments, a rear side of the mounting plate defines a guide slot extending in the up-down direction, and a front side of the limit slot is arranged with a guide block slidable with the guide slot; an inner wall surface of an upper part of the guide slot is arranged with a limit block, and the limit block abuts against a top surface of the guide block in response to the hook member sliding down to a preset working position.

In some embodiments, a rear side of a lower part of the connecting frame is arranged with a support projection.

In some embodiments, the hook member includes a storage cavity with an opening facing upward.

In some embodiments, a lower part of the hook member protrudes from a lower end of the connecting frame, and a rear side of the hook member is arranged with a support foot adjacent to a lower edge.

In the suction cup type hook of the present disclosure, the rotatable button is rotatably connected to the connecting rod of the suction cup, and the flexible deformation portion of the suction cup is deformed by the rotation of the rotatable button, such that a negative pressure space can be conveniently formed between the suction cup and the external support surface; in combination with above, the edge of the mounting cavity can be caused to abut against the edge of the flexible deformation portion, such that the flexible deformation portion forms a consistent and uniform deformation, which improves the sealing of the negative pressure space and thus improves the adsorption reliability of the suction cup type hook.

BRIEF DESCRIPTION OF THE DRAWINGS

In order to more clearly illustrate the technical solutions in the embodiments of the present disclosure, the following is a brief description of the accompanying drawings used in the description of the embodiments, it is obvious that the following description of the accompanying drawings are only some embodiments of the present disclosure, and for those skilled in the art, other drawings can be obtained based on these drawings without creative work.

NUMERAL REFERENCE

Figure 1:
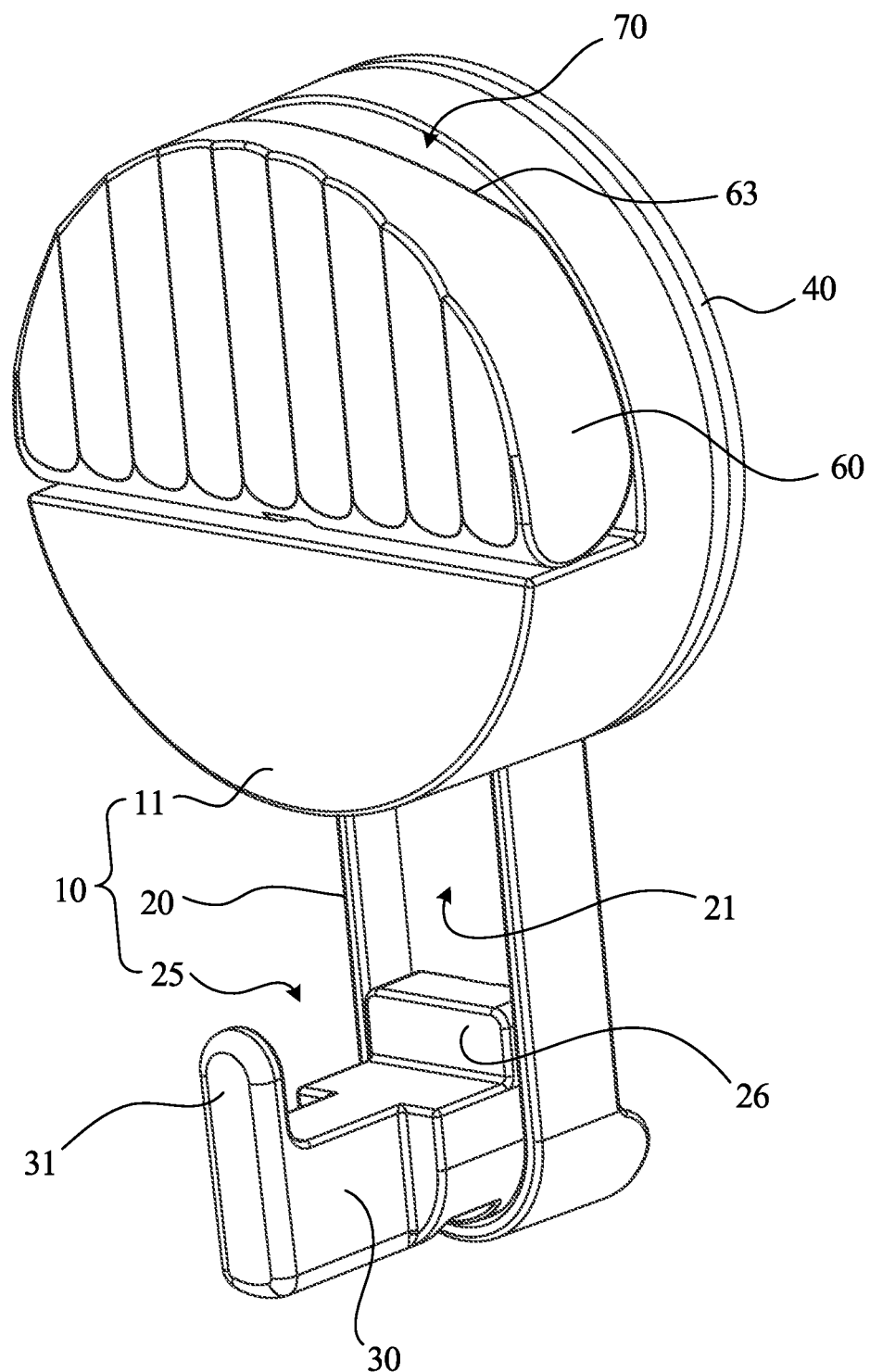
FIG. 1 is a perspective structural schematic view of a suction cup type hook according to a first embodiment of the present disclosure.
Figure 2:
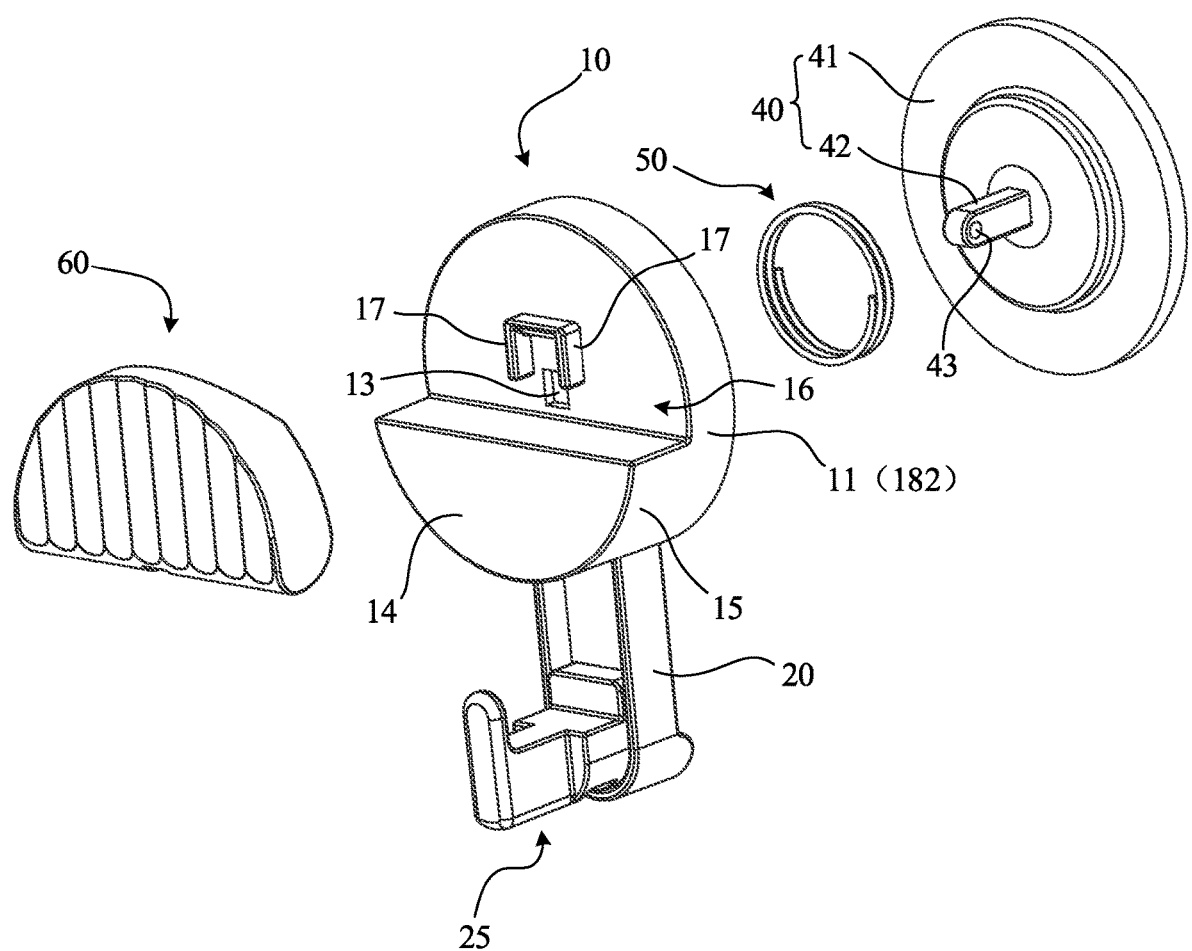
FIG. 2 is an exploded structural schematic view of the suction cup type hook shown in FIG. 1.
Figure 3:
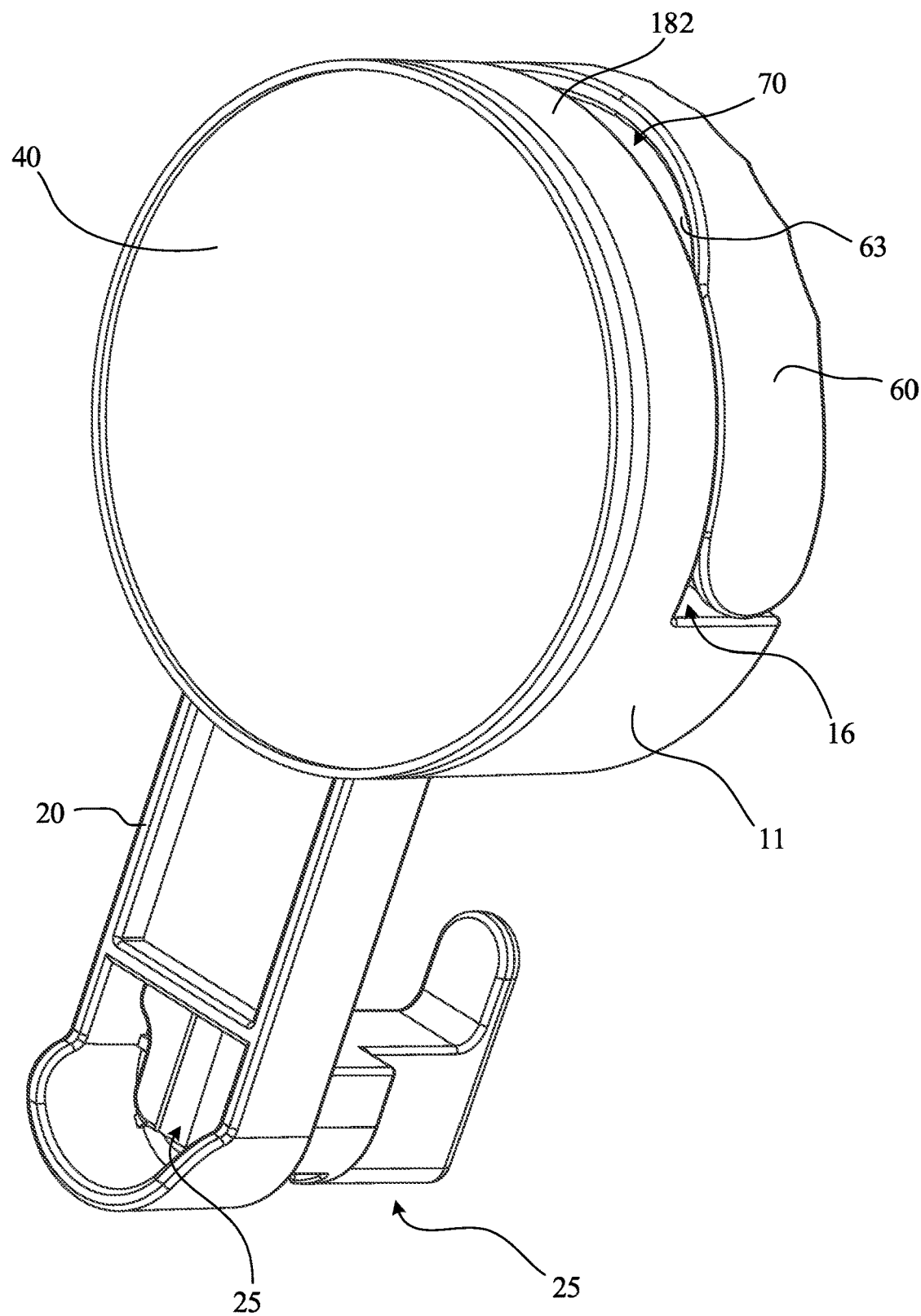
FIG. 3 is a perspective structural schematic view of a rear side of the suction cup type hook shown in FIG. 1.
Figure 4:
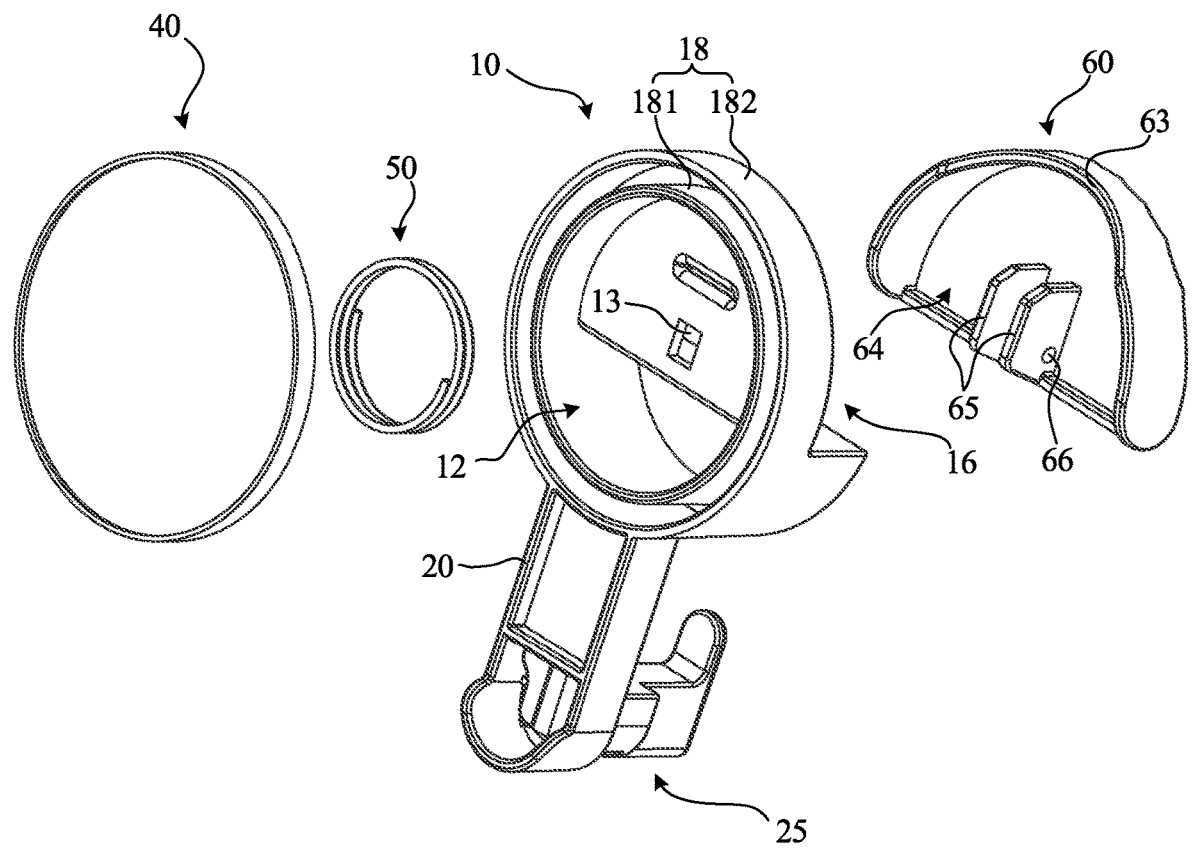
FIG. 4 is a perspective structural schematic view of the suction cup type hook shown in FIG. 1 from a rear view.
Figure 5:
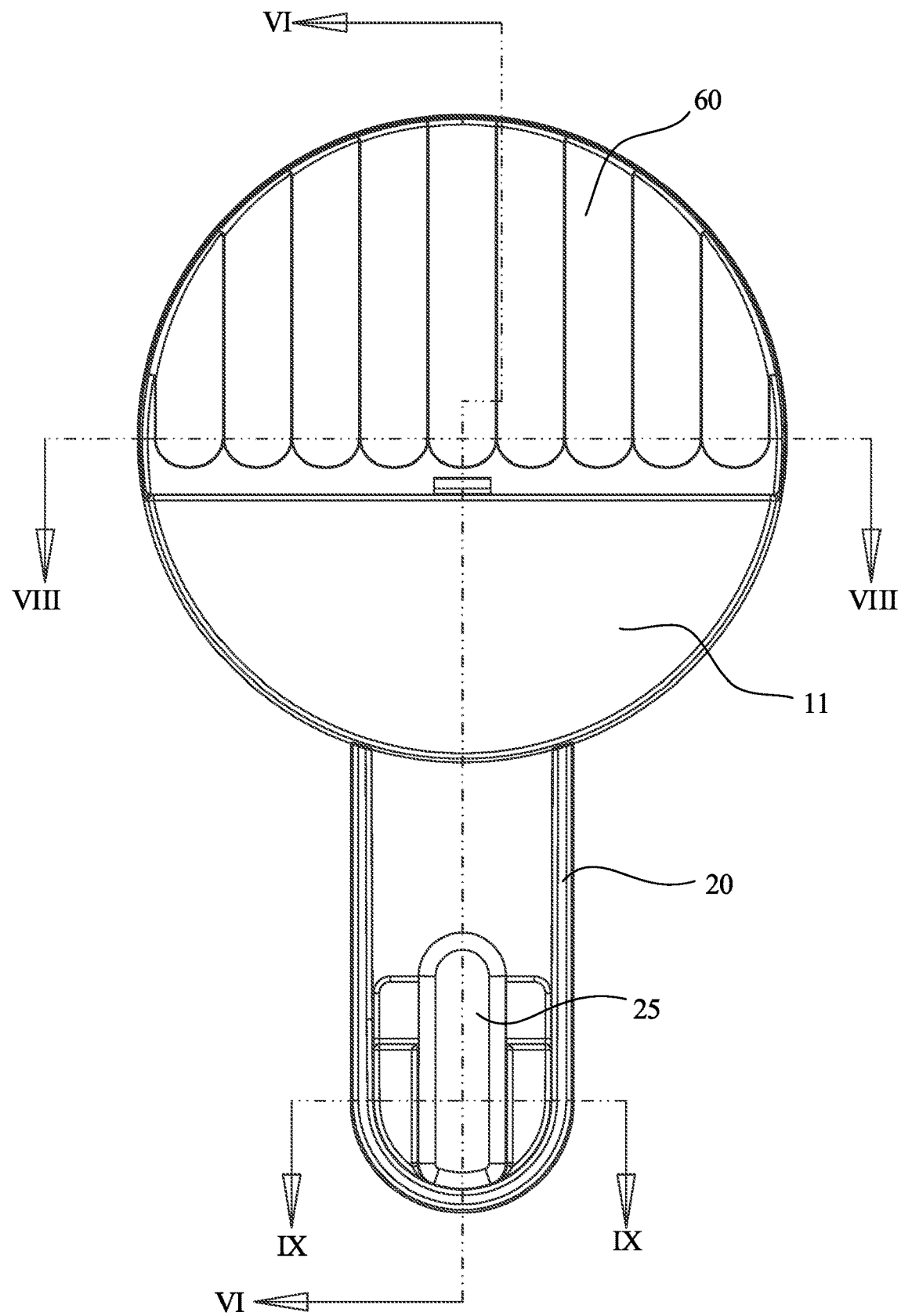
FIG. 5 is a front structural schematic view of the suction cup type hook shown in FIG. 1.
Figure 6:
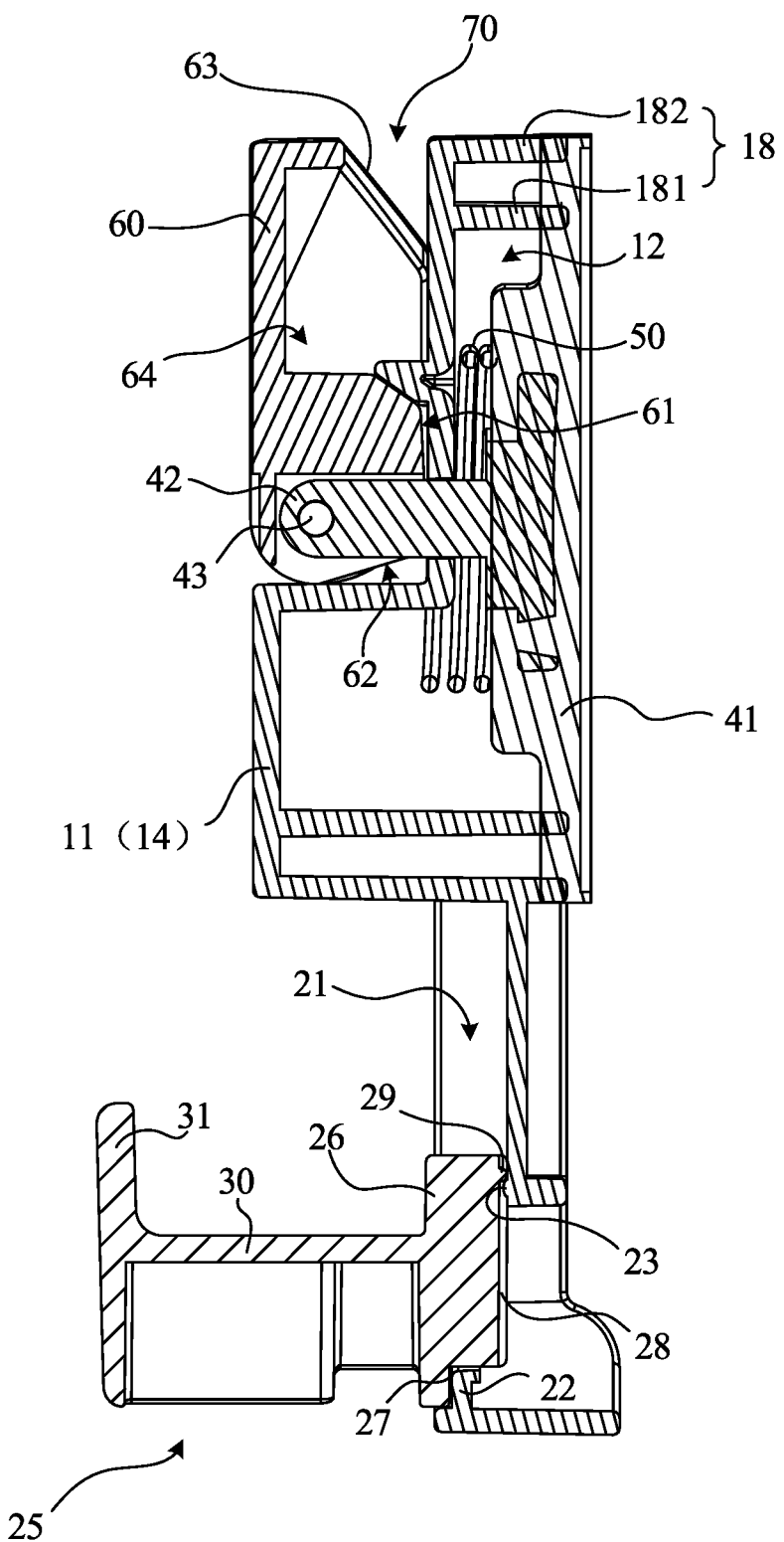
FIG. 6 is a cross-sectional structural schematic view along VI-VI in FIG. 5, wherein a rotatable button is in a snapped state.
Figure 7:
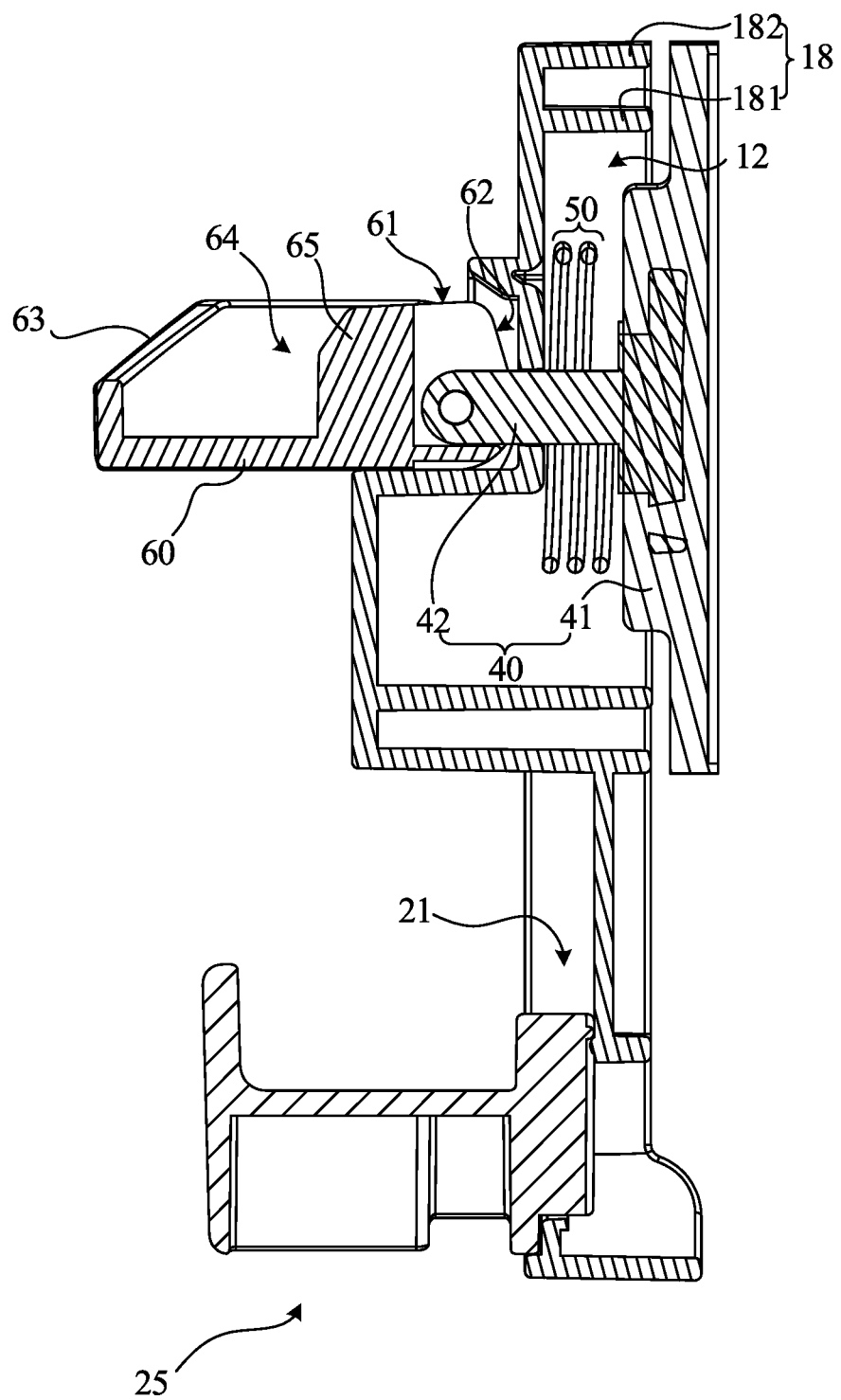
FIG. 7 is a cross-sectional structural schematic view along VI-VI in FIG. 5, wherein a rotatable button is in a lifted state.

| No. Name | No. Name | No. Name |
| --- | --- | --- |
| 100 Suction cup type hook | 20 Connecting frame | 41 Flexible deformation portion |
| 10 Hook body | 21 Limit slot | 42 Connecting Rod |
| 11 Mounting base | 22 Sliding guide | 43 Shaft hole |
| 12 Mounting cavity | 23 Guide block | 50 Spring |
| 13 Connecting hole | 25 Hook member | 60 Rotatable button |
| 14 Panel | 26 Mounting plate | 61 Snapping surface |
| 15 Rotation limit table | 27 Sliding slot | 62 Transition surface |
| 16 Rotation limit cavity | 28 Guide slot | 63 Chamfer |
| 17 Limit strip | 29 Limit block | 64 Rotation connecting cavity |
| 18 Annular wall | 30 Load-bearing portion | 65 Rotatable connecting plate |
| 181 First compression ring | 31 Suspension baffle | 66 Rotation hole |
| 182 Second compression ring | 40 Suction cup | 70 Operating slot |

DETAILED DESCRIPTION

The following will be a clear and complete description of the technical solutions in the embodiments of the present disclosure in conjunction with the accompanying drawings in the embodiments of the present disclosure. Obviously, the described embodiments are only a part of the embodiments of the present disclosure, and not all of them. Based on the embodiments in the present disclosure, all other embodiments obtained by those skilled in the art without creative labor fall within the scope of the present disclosure.

FIRST EMBODIMENT

Referring to FIGS. 1 to 7, in the first embodiment, the present disclosure proposes a suction cup type hook 100 including a hook body 10, a suction cup 40, a spring 50, and a rotatable button 60.

The hook body 10 defines a mounting cavity 12 opened toward a rear side and defines a connecting hole 13 connected to the mounting cavity 12 and arranged on the front side.

The suction cup 40 includes a flexible deformation portion 41 and a connecting rod 42 extending forward from the middle of the flexible deformation portion 41, the flexible deformation portion 41 being disposed on the rear side of the hook body 10; the connecting rod 42 extends out of the mounting cavity 12 through the connecting hole 13.

The spring 50 is sleeved on the connecting rod 42; an end of the spring is connected to an inner wall surface of the mounting cavity 12, and the other end of the spring is connected to a front side of the flexible deformation portion 41.

The rotatable button 60 is disposed on the front side of the hook body 10, and the rotatable button 60 is rotatably connected to a front end of the connecting rod 42 and has a lifted state and a snapped state relative to the hook body 10.

In the lifted state, the flexible deformation portion 41 is in a relaxed state and is separably arranged with an edge of the mounting cavity 12; when the rotatable button 60 is pressed to switch to the snapped state:

the rotatable button 60 pulls the middle of the flexible deformation portion 41 to protrude forward by the connecting rod 42, an edge of the flexible deformation portion 41 abuts against the edge of the mounting cavity 12, and a rear side of the flexible deformation portion 41 forms a concave arc.

In this embodiment, the hook body 10 may be a one-piece structure or split structure; in order to achieve the lightweight and meet the mass production of the product, the hook body 10 is generally manufactured by injection molding process. The flexible deformation portion 41 of the suction cup 40 and the connecting rod 42 are usually made of different materials; for example, the flexible deformation portion 41 is usually made of rubber or silicone, and the connecting rod 42 is made of plastic or metal. The hook body 10 is disposed on the front side of the flexible deformation portion 41 of the suction cup 40, such that the flexible deformation portion 41 can be shaded, thereby slowing down the aging of the flexible deformation portion 41. It is understood that in order to increase the strength of the connection between the flexible deformation portion 41 and the connecting rod 42, the suction cup 40 may further include an embedded part inside the suction cup 40 and fixedly connected with the connecting rod 42. The spring 50 is configured to return the flexible deformation portion 41 to its original state when the rotatable button 60 is lifted, i.e., to remove or reduce negative pressure space, thereby facilitating the user to separate the suction cup type hook 100 from an external support surface. The rotatable button 60 can form a forward driving force on the connecting rod 42 in the process of rotating, such that a gear engagement structure, cam structure, and other motion subsets can be formed between the rotatable button 60 and the hook body 10.

In the suction cup type hook 100 of the present disclosure, the rotatable button 60 is rotatably connected to the connecting rod 42 of the suction cup 40, and the flexible deformation portion 41 of the suction cup 40 is deformed by the rotation of the rotatable button, such that a negative pressure space can be conveniently formed between the suction cup 40 and the external support surface; in combination with above, the edge of the mounting cavity 12 can be caused to abut against the edge of the flexible deformation portion 41, such that the flexible deformation portion 41 forms a consistent and uniform deformation, which improves the sealing of the negative pressure space and thus improves the adsorption reliability of the suction cup type hook 100.

Further, the hook body 10 includes a mounting base 11, a connecting frame 20, and a hook member 25; the mounting cavity 12 is defined in the mounting base 11, the connecting frame 20 is fixedly connected to a bottom of the mounting base 11 and extends downward, and the hook member 25 is bent forward from the connecting frame 20.

In this embodiment, the mounting cavity 12 is defined in the mounting base 11 such that the shape of the suction cup type hook 100 can be compact, thereby reducing the space occupation. To facilitate production, in some embodiments, the mounting base 11 and the connecting frame 20 are of a one-piece structure. The hook member 25 may have only a hanging role, but may also have other additional roles. For example, the hook member may be a container. That is, the hook member 25 may be a common curved hook structure, and may be a structure that provides support and storage for external objects in a broad sense, such as a draining basket or box.

Further, the mounting base 11 includes a panel 14 and an annular wall 18 on a rear side of the panel 14, and the panel 14 and the annular wall 18 enclose the mounting cavity 12; the panel 14 defines the connecting hole 13 connected to the mounting cavity 12; the spring 50 is connected to the rear side of the panel 14; the rotatable button 60 includes a snapping surface 61 and a transition surface 62 inclined to the snapping surface 61, the rotatable button 60 is rotatably connected to the connecting rod 42 around a transverse pivot line, and both the snapping surface 61 and the transition surface 62 are disposed at a periphery of the pivot line; a vertical distance from the snapping surface 61 to the pivot line is greater than a vertical distance from the transition surface 62 to the pivot line.

The transition surface 62 is adjacent to a front side of the panel 14 when the rotatable button 60 is in the lifted state.

The snapping surface 61 abuts against the front side of the panel 14 when the rotatable button 60 is in the snapped state.

In this embodiment, the snapping surface 61 and the transition surface 62 of the rotatable button 60 form a cam mechanism, such that the rotatable button 60 can smoothly switch between the lifted state and the snapped state and effectively pull forward the flexible deformation portion 41 of the suction cup 40 or cause the suction cup 40 to be released.

Further, the annular wall 18 includes a first compression ring 181 and a second compression ring 182 that are arranged concentrically from inside to outside; in the snapped state, the first compression ring 181 and the second compression ring 182 respectively abut against the edge of the flexible deformation portion 41.

In this embodiment, the annular wall 18 is provided with a double-layer structure such that a larger area of the edge of the flexible deformation portion 41 is guided by a hard structure in the radially outward direction, thereby forming a more uniform deformation; in addition, due to an annular space formed between the first compression ring 181 and the second compression ring 182, the flexible deformation portion 41 can be deformed inwardly, such that the flexible deformation portion 41 is also less likely to be loosened from the annular wall 18, improving the sealing from another perspective.

Further, the panel 14 is bent in a step shape to form a rotation limit table 15 disposed in the lower part and a rotation limit cavity 16 disposed in the upper part; the connecting hole 13 is opened on a front side of the rotation limit cavity 16; in the snapped state, the rotatable button 60 is disposed in the rotation limit cavity 16.

An outer edge of the panel 14 is rounded, an upper side of the rotation limit cavity 16 is set horizontally, and the shape of the rotatable button 60 is adapted to the rotation limit cavity 16 in a fan-shaped structure.

A chamfer 63 is formed between an upper part of an outer periphery of the rotatable button 60 and a rear side of the rotatable button 60, and the chamfer 63 is enclosed with the front side of the rotation limit cavity 16 to define an operating slot 70.

In this embodiment, the rotation limit cavity 16 can limit the rotation of the rotatable button 60 to prevent the rotatable button 60 from accidentally rotating. The rotatable button 60 is disposed in the rotation limit cavity 16 in the snapped state and is shaped in a suitable fan shape, such that the rotatable button 60 can be prevented from being operated by mistake. The top side of the rotatable button 60 is provided with the chamfer 63, such that the operating slot 70 can be easily formed and the user can lift the rotatable button 60.

Figure 8:
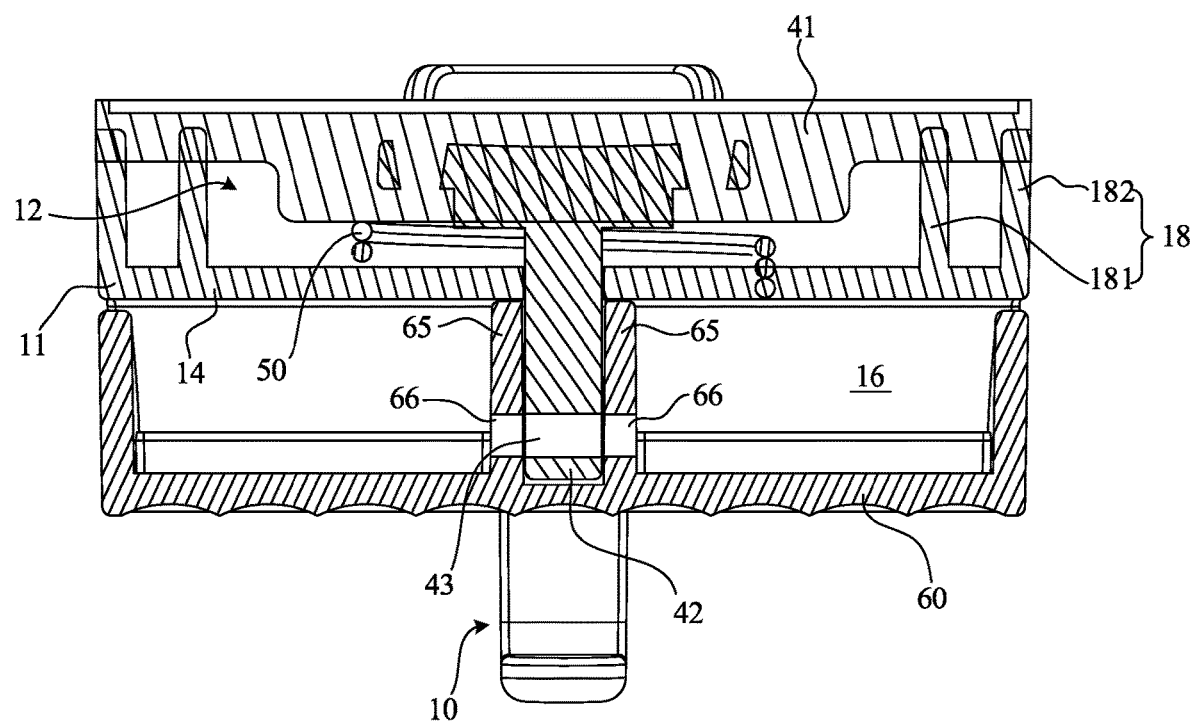
FIG. 8 is a cross-sectional structural schematic view along VIII-VIII in FIG. 5.
Figure 9:
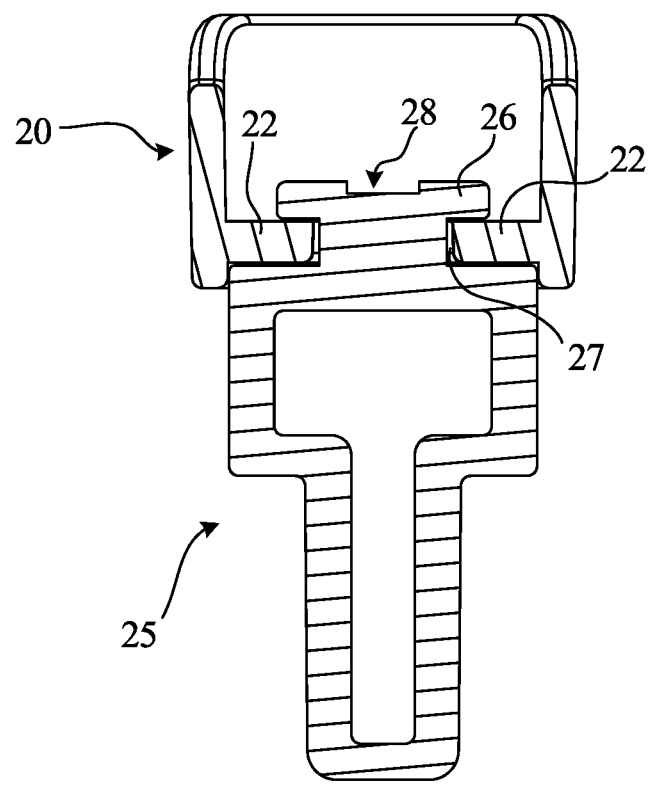
FIG. 9 is a cross-sectional structural schematic view along IX-IX in FIG. 5.
Figure 10:
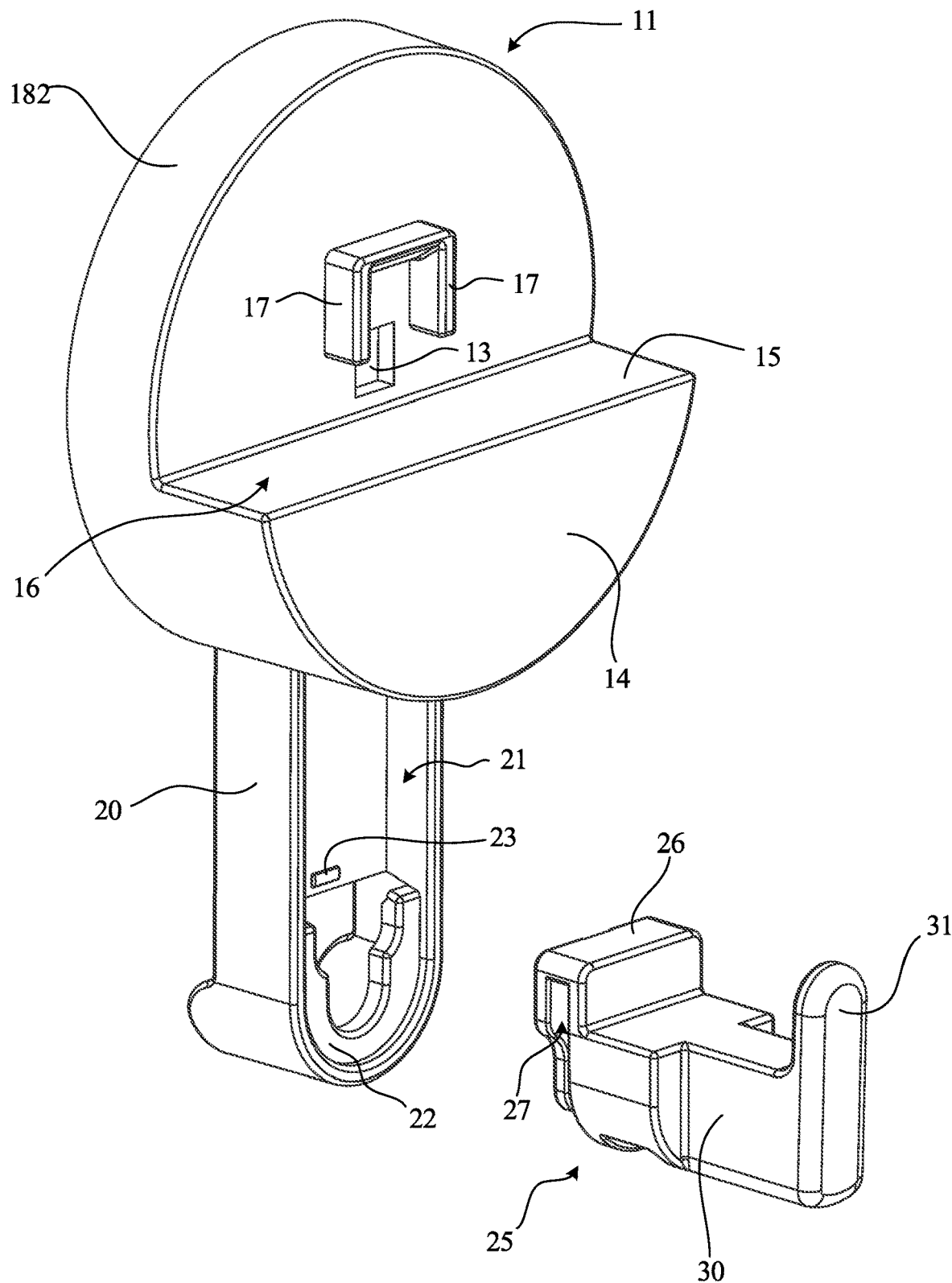
FIG. 10 is an exploded structural schematic view of a hook body shown in FIG. 1 from a front view.
Figure 11:
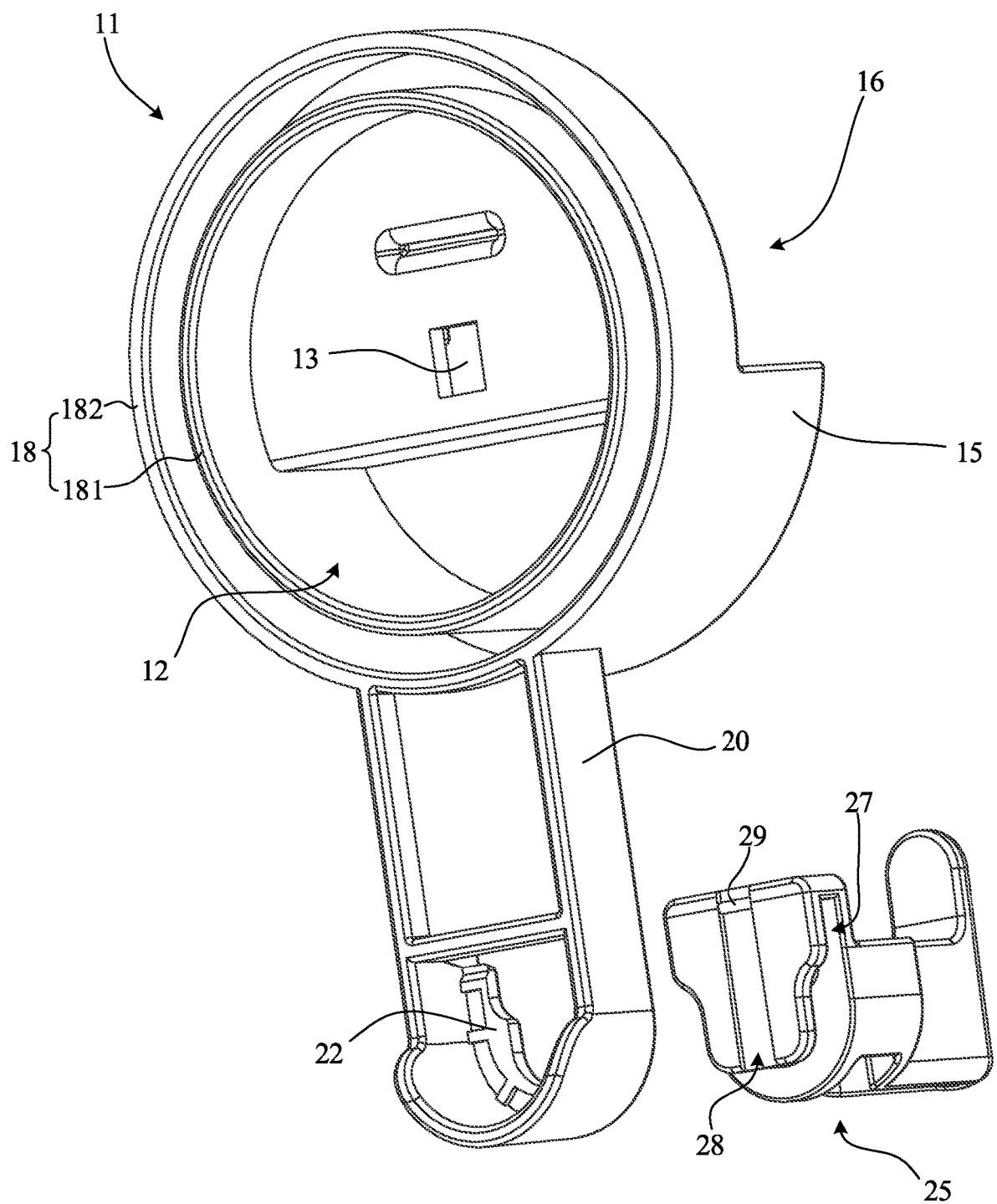
FIG. 11 is an exploded structural schematic view of a hook body shown in FIG. 1 from a rear view.
Figure 12:
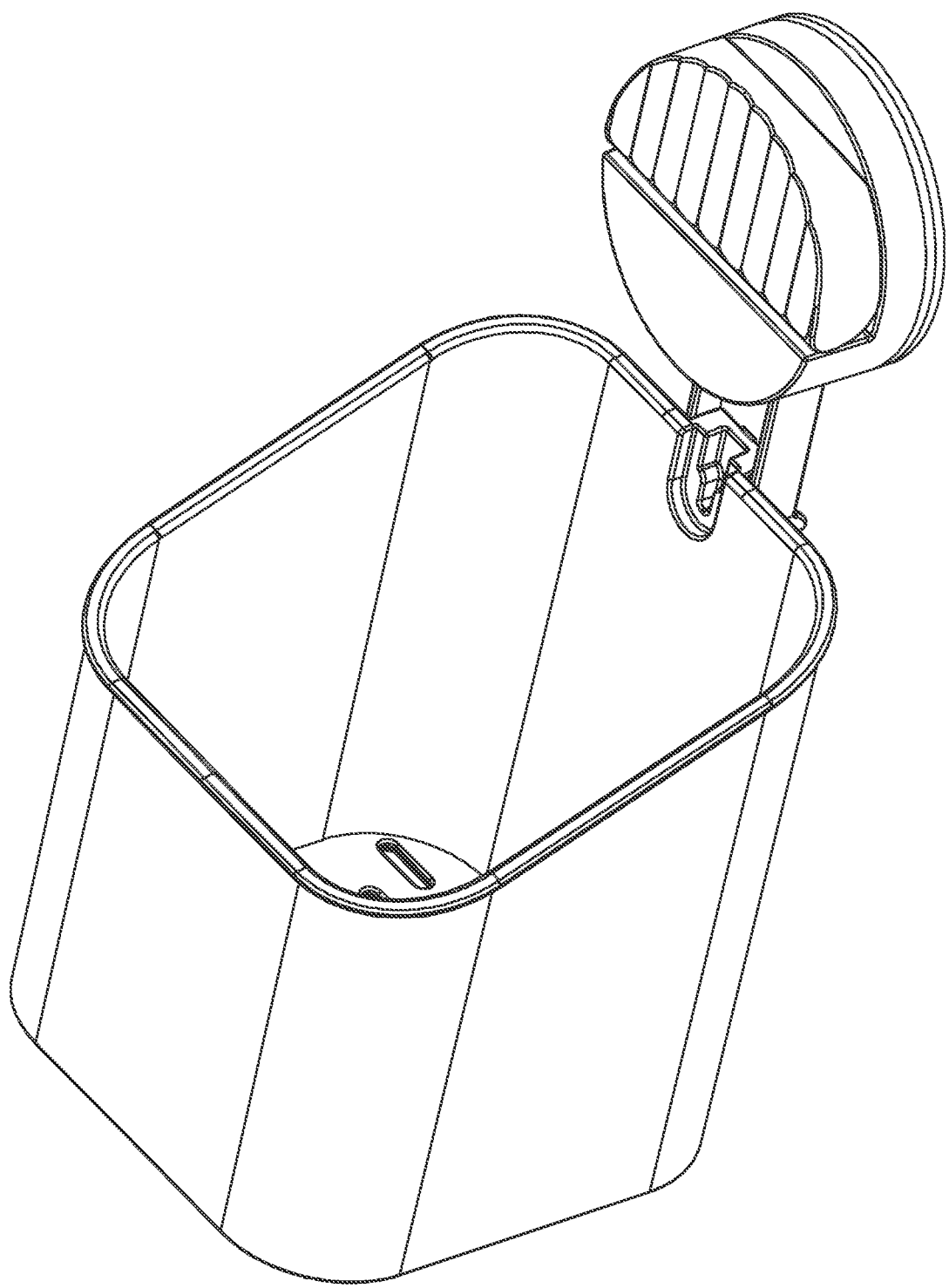
FIG. 12 is a perspective structural schematic view of a suction cup type hook according to a second embodiment of the present disclosure.
Figure 13:
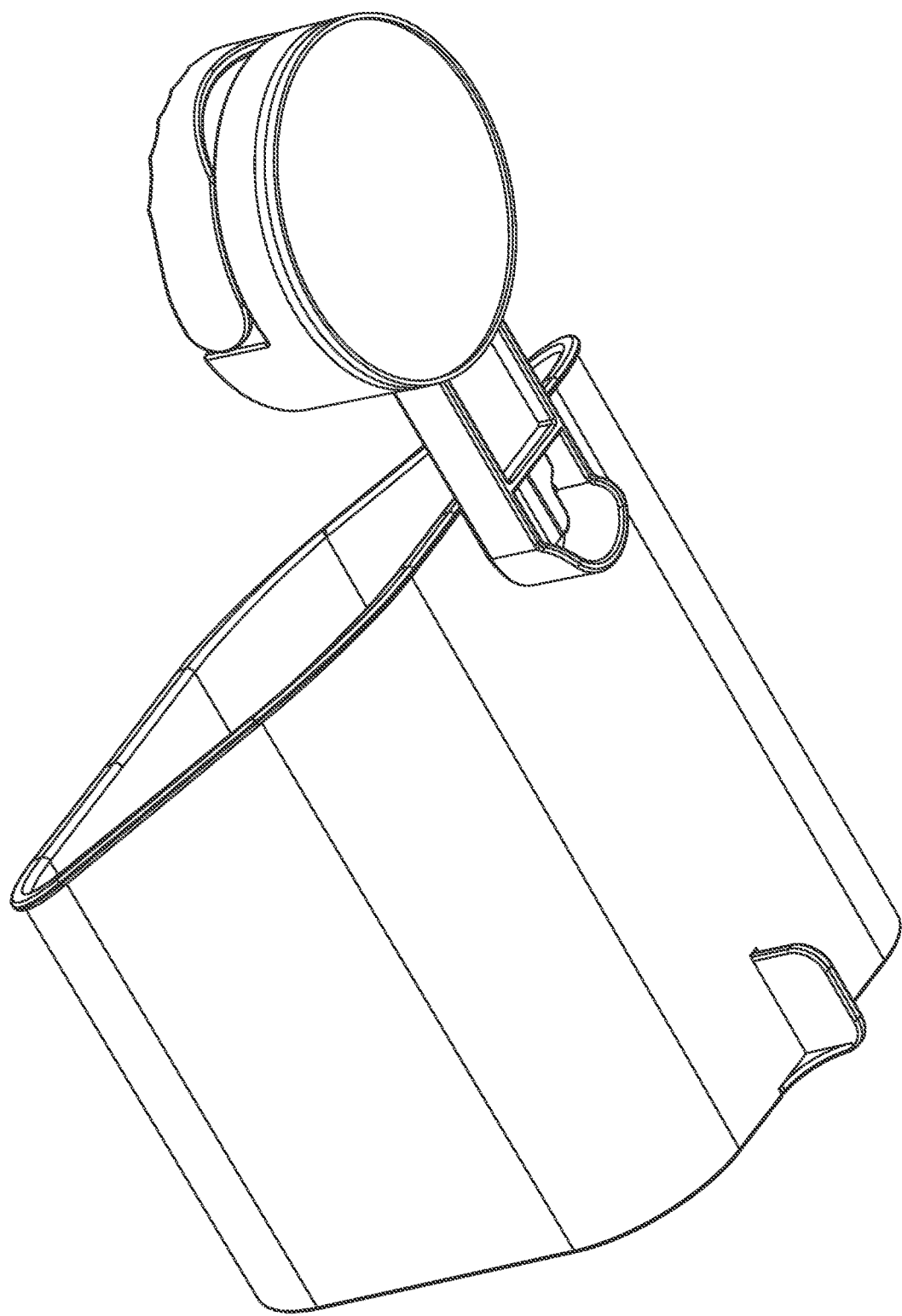
FIG. 13 is a perspective structural schematic view of a rear side of the suction cup type hook shown in FIG. 12.
Figure 14:
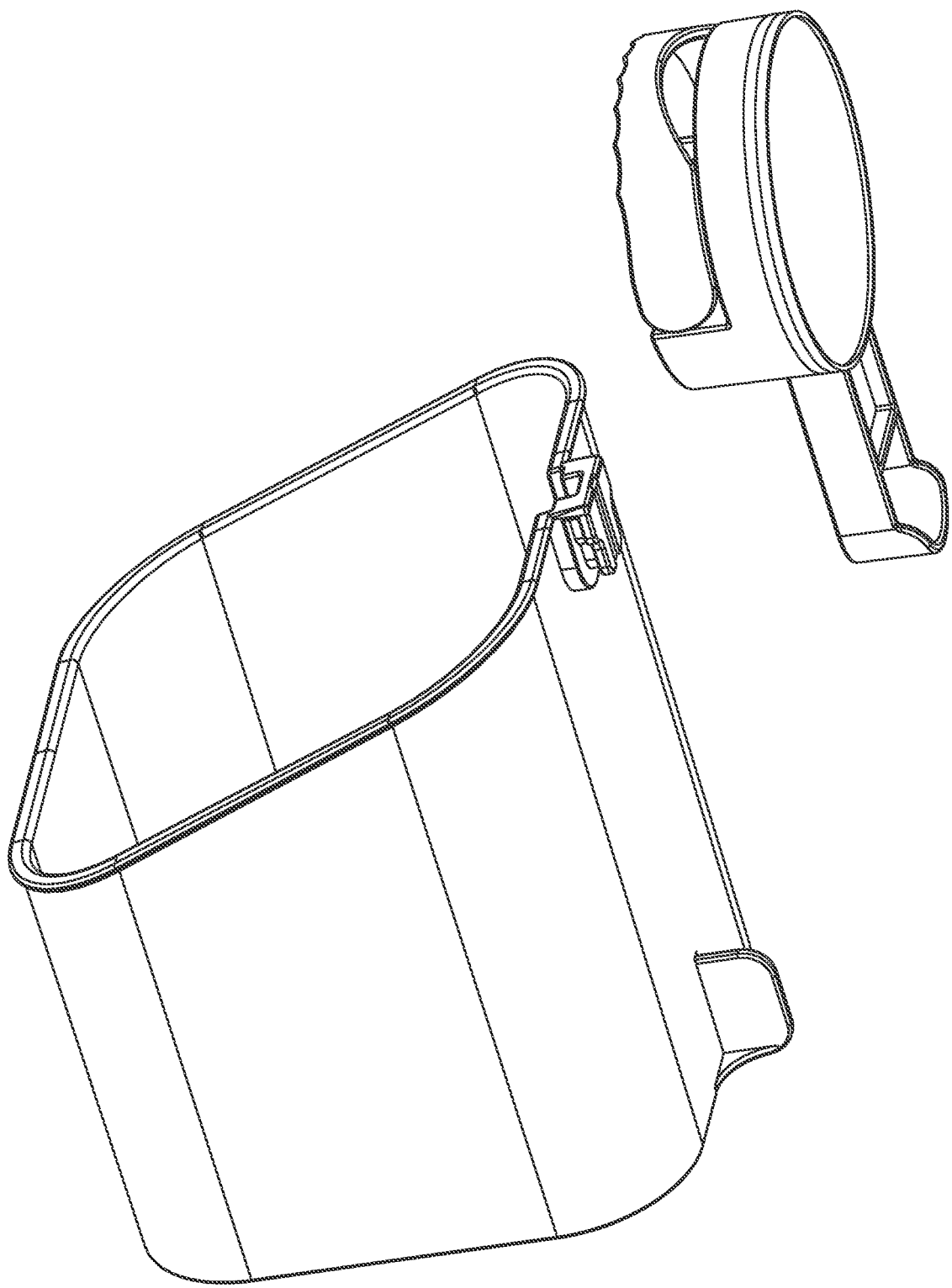
FIG. 14 is an exploded structural schematic view of the suction cup type hook shown in FIG. 12.

Further, referring to FIG. 8, FIG. 10, and FIG. 11 together, in the first embodiment, the rear side of the rotatable button 60 is recessed and defines a rotation connecting cavity 64, and two rotating connection plates 65 are fixed in the rotation connecting cavity 64; the two rotating connection plates 65 are parallel to each other and opposite in the left and right directions, and each rotating connection plate 65 defines a rotation hole 66, and the snapping surface 61 and the transition surface 62 are formed on the rotating connection plates 65.

The connecting rod 42 defines transversely a shaft hole 43; the rotatable button 60 is rotatably connected to the connecting rod 42 by means of a shaft (not shown) passing through the shaft hole 43 and the two rotation holes 66.

Two limit strips 17 are arranged and protrude from the front side of the rotation limit cavity 16, which are parallel to each other and opposite in the left and right directions, and the two rotating connection plates 65 are restrictively arranged between the two limit strips 17.

In this embodiment, the pivoting structure of the rotatable button 60 is formed by providing the rotating connection plates 65 to ensure stable rotation while achieving a lightweight structure; in addition, the rotating connection plates 65 are disposed in the rotation connecting cavity 64, such that it is convenient to arrange the pivot shaft, i.e., convenient to assemble; and the snapping surface 61 and the transition surface 62 are formed on the rotating connection plates 65 such that the structure of the rotatable button 60 can be simplified. The structure can be further simplified by defining the shaft hole 43 directly on the connecting rod 42, thereby making the suction cup 40 easier to produce. The two limit strips 17 are arranged on the outside of the two rotating connection plates 65 to prevent the rotatable buttons 60 from shaking during operation.

Further, referring to FIGS. 1 to 7 and FIGS. 9 to 11, in the first embodiment, a rear end of the hook member 25 may be removably plugged into the connecting frame 20 in order to facilitate the connection of different hook members to the connecting frame 20. In the use state, the hook member 25 protrudes forward from the connecting frame 20, such that the shape is larger and the hook member 25 is more vulnerable to collision with foreign objects, which in turn leads to damage to the hook member 25. In addition, because the hook member 25 and the connecting frame can be disassembled and plugged, in the process of packaging and transportation, the hook member 25 and the connecting frame 20 can be separated first; and when the user needs to use the product, the hook member 25 and the connector can be assembled, which is convenient for packaging and reduces the risk of damaging the hook member 25 during transportation.

Further, the connecting frame 20 defines a limit slot 21, which is open towards the front side, and a sliding guide 22 is arranged on and protrudes from an inner side of a lower part of the limit slot 21; a width of the rear end of the hook member 25 is adapted to a width of an upper part of the limit slot 21, and the rear end of the hook member 25 defines a sliding slot 27 that can slide up and down with the sliding guide 22.

In this embodiment, when assembling, the rear end of the hook member 25 can be inserted into the upper part of the limit slot 21, and the hook member 25 is moved downward to make the sliding slot 27 and the sliding guide 22 to match, such that the installation of the hook member 25 can be realized without other tools.

Further, the hook member 25 includes a mounting plate 26, a load-bearing portion 30, and a suspension baffle 31; the mounting plate 26 is arranged forward, the load-bearing portion 30 is fixedly connected to the mounting plate 26 and bent forward relative to the mounting plate 26, and the suspension baffle 31 is fixedly connected to a front end of the load-bearing portion 30 and bent upward; the lower part of the limit slot 21 is through in the front and rear directions, the sliding guide 22 is U-shaped; a width of a lower part of the mounting plate 26 is tapering from top to bottom, and the sliding slot 27 is defined on an outer periphery of the lower part of the mounting plate 26 and is U-shaped.

In this embodiment, the sliding guide 22 and the sliding slot 27 are both U-shaped such that the two can cooperate to support and positionally limit the hook member 25 upward, and the lower part of the limit slot 21 is through the front and back, facilitating the processing and molding of the sliding guide 22, for example, facilitating the injection molding process. The suspension baffle 31 may prevent suspended items from being loosened outward along the load-bearing portion 30.

Further, a rear side of the mounting plate 26 defines a guide slot 28 extending in the up and down directions, and a front side of the limit slot 21 is arranged with a guide block 23 slidable with the guide slot 28.

An inner wall surface of an upper part of the guide slot 28 is arranged with a limit block 29, and the limit block 29 abuts against a top surface of the guide block 23 when the hook member 25 slides down to a preset working position.

In this embodiment, the guide block 23 and the guide slot 28 can further guide the hook member 25 to slide up and down smoothly, and when moving down to the preset working position, the limit block 29 and the guide block 23 may play a limiting role and prompt the user that it has been installed in place.

Further, in order to avoid the breakage of the connecting frame 20 under the action of bias pressure in the direction toward the external vertical support surface, a rear side of a lower part of the connecting frame 20 may be arranged with a support projection (not shown).

SECOND AND THIRD EMBODIMENTS

Further, referring to FIGS. 12-15, different from the first embodiment, the hook member (not shown) includes a storage cavity with an opening facing upward. In this way, the hook member can support and hold hung items together.

Figure 15:
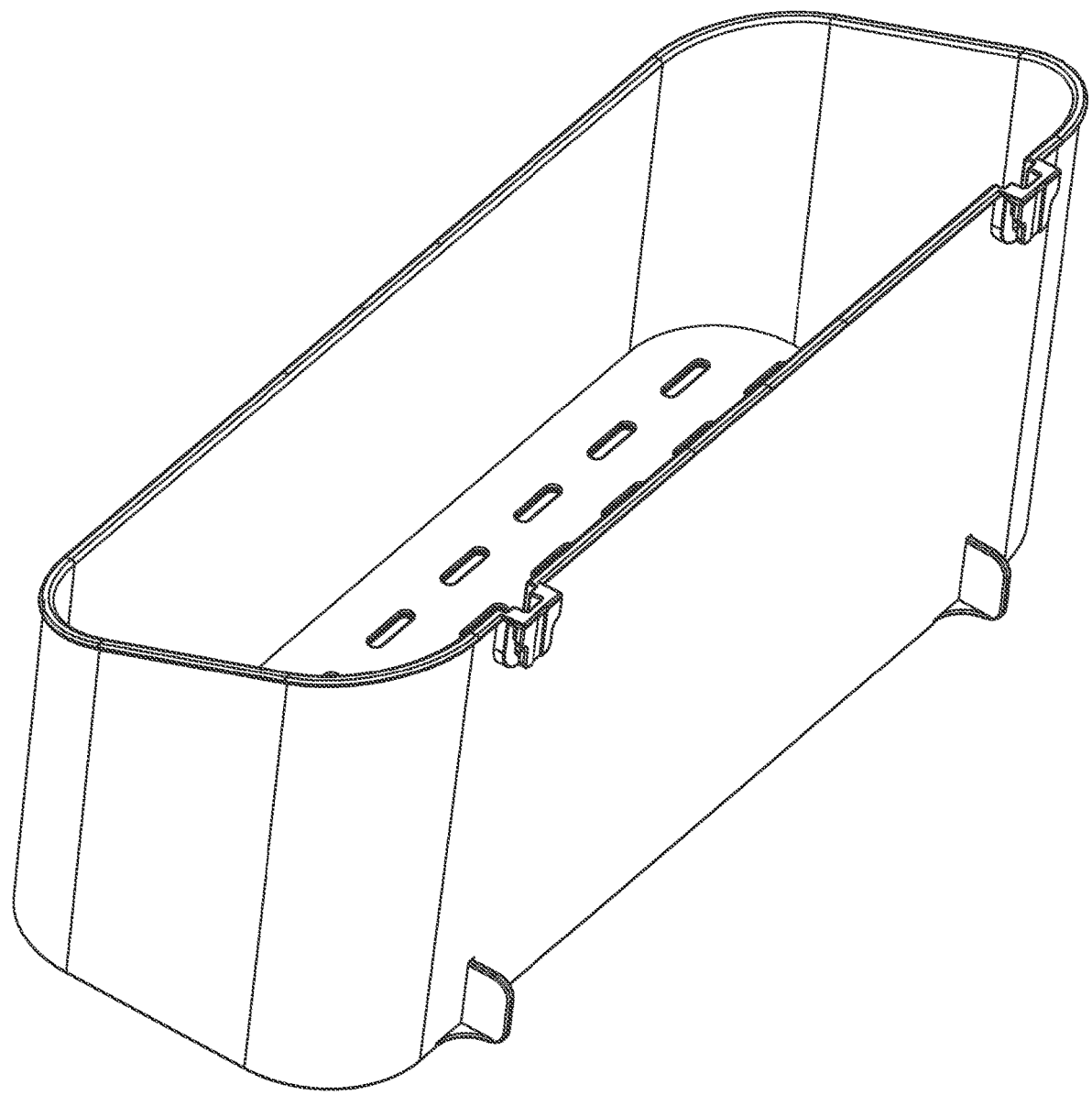
FIG. 15 is a perspective structural schematic view of a suction cup type hook according to a third embodiment of the present disclosure.

Further, the lower part of the hook member protrudes from the lower end of the connecting frame 20, and the rear side of the hook member is arranged with a support foot (not shown) adjacent to a lower edge. In this way, the hook member can overcome a greater bias force, thereby allowing heavier items to be loaded. Referring to FIG. 15, in a case where the left and right directions of the hook member are larger in size, multiple support feet may be arranged for enhancing stability, and the multiple support feet are evenly distributed in the left and right directions. For the convenience of manufacturing, the support feet and the hook member may be set separately, and the support feet may be detachably installed on the rear side of the hook member.

FOURTH EMBODIMENT

Further, different from the first embodiment, the front side of the flexible deformation portion 41 defines an annular positioning slot (not shown) at an outer periphery of the connecting rod 42; a gap is defined between an inner diameter engagement surface of the rear end of the spring 50 and the outer periphery of the connecting rod 42, and the rear end of the spring 50 is embedded in the annular positioning slot.

In this embodiment, the spring 20 may be an equal diameter compression spring or a variable diameter compression spring; in order to improve stability, when the spring is a variable diameter compression spring, a large end of the spring is embedded in the annular positioning slot. The rear end of the spring is embedded in the annular positioning slot such that the rear end of the spring is not easily loosened and eccentric in the process of use, and thus the spring can stably reset.

Finally, it should be noted that the above embodiments are used only to illustrate the technical solution of the present disclosure, not to limit it; although the present disclosure is described in detail with reference to the foregoing embodiments, it is understood by those skilled in the art that it is still possible to modify the technical solution recorded in the foregoing embodiments, or to replace some of the technical features; and these modifications or substitutions do not drive the essence of the technical solutions away from the spirit and scope of the technical solutions of the embodiments of the present disclosure.

What is claimed is:

1. A suction cup type hook, comprising:
   a hook body,
   a suction cup,
   a spring, and
   a rotatable button; wherein
   the hook body defines a mounting cavity opened toward a rear side and defines a connecting hole connected to the mounting cavity and arranged on a front side;
   the suction cup comprises a flexible deformation portion and a connecting rod extending forward from a middle of the flexible deformation portion, the flexible deformation portion being disposed on the rear side of the hook body; the connecting rod extends out of the mounting cavity through the connecting hole;
   the spring is sleeved on the connecting rod; an end of the spring is connected to an inner wall surface of the mounting cavity, and the other end of the spring is connected to a front side of the flexible deformation portion;
   the rotatable button is disposed on the front side of the hook body, and the rotatable button is rotatably connected to a front end of the connecting rod and has a lifted state and a snapped state relative to the hook body;
   in the lifted state, the flexible deformation portion is in a relaxed state and is separably arranged with an edge of the mounting cavity; when the rotatable button is pressed to switch to the snapped state:
   the rotatable button pulls the middle of the flexible deformation portion to protrude forward by the connecting rod, an edge of the flexible deformation portion abuts against the edge of the mounting cavity, and a rear side of the flexible deformation portion forms a concave arc;
   the hook body comprises a mounting base: the mounting base comprises an annular wall;
   the annular wall comprises a first compression ring and a second compression ring that are arranged concentrically from inside to outside: in the snapped state, the first compression ring and the second compression ring respectively abut against the edge of the flexible deformation portion.

2. The suction cup type hook according to claim 1, wherein the hook body comprises a connecting frame, and a hook member; the mounting cavity is defined in the mounting base, the connecting frame is fixedly connected to a bottom of the mounting base and extends downward, and the hook member is bent forward from the connecting frame.

3. The suction cup type hook according to claim 2, wherein,
   the mounting base comprises a panel; the annular wall is arranged on a rear side of the panel, and the panel and the annular wall enclose the mounting cavity; the panel defines the connecting hole connected to the mounting cavity;
   the spring is connected to the rear side of the panel;
   the rotatable button comprises a snapping surface and a transition surface inclined to the snapping surface, the rotatable button is rotatably connected to the connecting rod around a transverse pivot line, and both the snapping surface and the transition surface are disposed at a periphery of the pivot line; a vertical distance from the snapping surface to the pivot line is greater than a vertical distance from the transition surface to the pivot line;
   the transition surface is adjacent to a front side of the panel in response to the rotatable button being in the lifted state;

the snapping surface abuts against the front side of the panel in response to the rotatable button being in the snapped state.

4. A suction cup type hook, comprising:
a hook body,
a suction cup,
a spring, and
a rotatable button; wherein
the hook body defines a mounting cavity opened toward a rear side and defines a connecting hole connected to the mounting cavity and arranged on a front side;
the suction cup comprises a flexible deformation portion and a connecting rod extending forward from a middle of the flexible deformation portion, the flexible deformation portion being disposed on the rear side of the hook body; the connecting rod extends out of the mounting cavity through the connecting hole;
the spring is sleeved on the connecting rod; an end of the spring is connected to an inner wall surface of the mounting cavity, and the other end of the spring is connected to a front side of the flexible deformation portion;
the rotatable button is disposed on the front side of the hook body, and the rotatable button is rotatably connected to a front end of the connecting rod and has a lifted state and a snapped state relative to the hook body;
in the lifted state, the flexible deformation portion is in a relaxed state and is separably arranged with an edge of the mounting cavity; when the rotatable button is pressed to switch to the snapped state;
the rotatable button pulls the middle of the flexible deformation portion to protrude forward by the connecting rod, an edge of the flexible deformation portion abuts against the edge of the mounting cavity, and a rear side of the flexible deformation portion forms a concave arc;
the hook body comprises a mounting base; the mounting base comprises a panel; the panel is bent in a step shape to form a rotation limit table disposed in a lower part and a rotation limit cavity disposed in an upper part; the connecting hole is opened on a front side of the rotation limit cavity; in the snapped state, the rotatable button is disposed in the rotation limit cavity;
an outer edge of the panel is rounded, an upper side of the rotation limit cavity is set horizontally, and a shape of the rotatable button is adapted to the rotation limit cavity in a fan-shaped structure;
a chamfer is formed between an upper part of an outer periphery of the rotatable button and a rear side of the rotatable button, and the chamfer is enclosed with the front side of the rotation limit cavity to define an operating slot.

5. The suction cup type hook according to claim 4, wherein the rear side of the rotatable button is recessed and defines a rotation connecting cavity, and two rotating connection plates are fixed in the rotation connecting cavity; the two rotating connection plates are parallel to each other and opposite in a left-right direction; each rotating connection plate defines a rotation hole, and the snapping surface and the transition surface are formed on the two rotating connection plates;
the connecting rod defines transversely a shaft hole; the rotatable button is rotatably connected to the connecting rod by a shaft passing through the shaft hole and the two rotation holes;
two limit strips are arranged and protrude from the front side of the rotation limit cavity, which are parallel to each other and opposite in the left-right direction, and the two rotating connection plates are restrictively arranged between the two limit strips.

6. A suction cup type hook, comprising:
a hook body,
a suction cup,
a spring, and
a rotatable button; wherein
the hook body defines a mounting cavity opened toward a rear side and defines a connecting hole connected to the mounting cavity and arranged on a front side;
the suction cup comprises a flexible deformation portion and a connecting rod extending forward from a middle of the flexible deformation portion, the flexible deformation portion being disposed on the rear side of the hook body; the connecting rod extends out of the mounting cavity through the connecting hole;
the spring is sleeved on the connecting rod; an end of the spring is connected to an inner wall surface of the mounting cavity, and the other end of the spring is connected to a front side of the flexible deformation portion;
the rotatable button is disposed on the front side of the hook body, and the rotatable button is rotatably connected to a front end of the connecting rod and has a lifted state and a snapped state relative to the hook body;
in the lifted state, the flexible deformation portion is in a relaxed state and is separably arranged with an edge of the mounting cavity; when the rotatable button is pressed to switch to the snapped state;
the rotatable button pulls the middle of the flexible deformation portion to protrude forward by the connecting rod, an edge of the flexible deformation portion abuts against the edge of the mounting cavity, and a rear side of the flexible deformation portion forms a concave arc;
the hook body comprises a connecting frame and a hook member;
a rear end of the hook member is removably plugged into the connecting frame.

7. The suction cup type hook according to claim 6, wherein the connecting frame defines a limit slot opened towards a front side, and a sliding guide is arranged on and protrudes from an inner side of a lower part of the limit slot; a width of the rear end of the hook member is adapted to a width of an upper part of the limit slot, and the rear end of the hook member defines a sliding slot adapted to the sliding guide for sliding up and down.

8. The suction cup type hook according to claim 7, wherein,
the hook member comprises a mounting plate, a load-bearing portion, and a suspension baffle; the mounting plate is arranged forward, the load-bearing portion is fixedly connected to the mounting plate and bent forward relative to the mounting plate, and the suspension baffle is fixedly connected to a front end of the load-bearing portion and bent upward;
the lower part of the limit slot is through in a front-rear direction, the sliding guide is U-shaped; a width of a lower part of the mounting plate is tapering from top to bottom in an up-down direction, and the sliding slot is defined on an outer periphery of the lower part of the mounting plate and is U-shaped.

9. The suction cup type hook according to claim 8, wherein a rear side of the mounting plate defines a guide slot extending in the up-down direction, and a front side of the limit slot is arranged with a guide block slidable with the guide slot;

an inner wall surface of an upper part of the guide slot is arranged with a limit block, and the limit block abuts against a top surface of the guide block in response to the hook member sliding down to a preset working position.

10. The suction cup type hook according to claim 2, wherein a rear side of a lower part of the connecting frame is arranged with a support projection.

11. The suction cup type hook according to claim 2, wherein the hook member comprises a storage cavity with an opening facing upward.

12. The suction cup type hook according to claim 2, wherein a lower part of the hook member protrudes from a lower end of the connecting frame, and a rear side of the hook member is arranged with a support foot adjacent to a lower edge.

\* \* \* \* \*